June 16, 1953 S. FEINSTEIN 2,642,544

METHOD AND APPARATUS FOR COMPARING ELECTRIC SIGNALS

Filed Dec. 23, 1950

INVENTOR.
SAMUEL FEINSTEIN
BY Eyre, Mann & Barrows
ATTORNEYS

Patented June 16, 1953 2,642,544

UNITED STATES PATENT OFFICE 2,642,544

METHOD AND APPARATUS FOR COMPARING ELECTRIC SIGNALS

Samuel Feinstein, Brooklyn, N. Y., assignor to Servomechanisms, Inc., Mineola, N. Y., a corporation of New York Application December 23, 1950, Serial No. 202,490

6 Claims. (Cl. 307—43)

This invention relates to a modulating circuit of the type responsive to two or more electric input signals to produce an intermittent or oscillating output signal having a rate of change and amplitude proportional to that of the combined input signals.

Modulating circuits of this general class are useful in a variety of applications as, for instance, servomechanisms, computers and the like. In servos, for instance, direct current control signals are frequently used and one of these direct current signals may be a primary controlling signal of one form or another, while the other signal may be a feedback signal the amplitude and rate of change of which is a function of the output of the servo unit. These two direct current signals are treated and combined to produce a so-called error signal to which the servo apparatus responds. In the process of combining the signals, a switching device such as a vibrator or the like is used to obtain an intermittent signal and this signal is then amplified by an alternating current amplifier.

In order to improve the response of the servo device to changes in the direct current signals it is desirable to modify the changes in the direct current signals by differentiating and integrating networks. This is presently accomplished, to my knowledge, by separate signal treating circuits for each of the signals. As these circuits usually consist of a number of resistors and condensers, the components for each circuit must be carefully and accurately matched. From actual tests, however, it was found that the charge and discharge rates of similar condensers not only varied sufficiently so that identical treatment was not accorded each signal, but it was exceedingly difficult to match all the components in each network to produce an error signal with even satisfactory accuracy. Because of the high order of accuracy required, even slight differences were found to be sufficient to introduce appreciable error in the resultant signal and seriously impair the accuracy of precision servo equipment.

I have been able to overcome this difficulty by my invention through the use of a single treating network serving for both signals and thus eliminating the need for matching of components and thereby completely avoiding errors introduced by component characteristics not practically determinable in production operations. The character and degree of treatment of the signals is not critical, but it is important that like treatment must be accorded both signals.

With this invention, therefore, wider tolerances of the components can be permitted with no effect whatever on the accuracy of the result. The invention therefore greatly reduces the cost of a heretofore highly critical and expensive network and of course vastly improves the accuracy of the device.

The above and other objects and advantages of the invention will become more apparent in the following description and accompanying drawings forming part of this application.

Figures 1, 2:
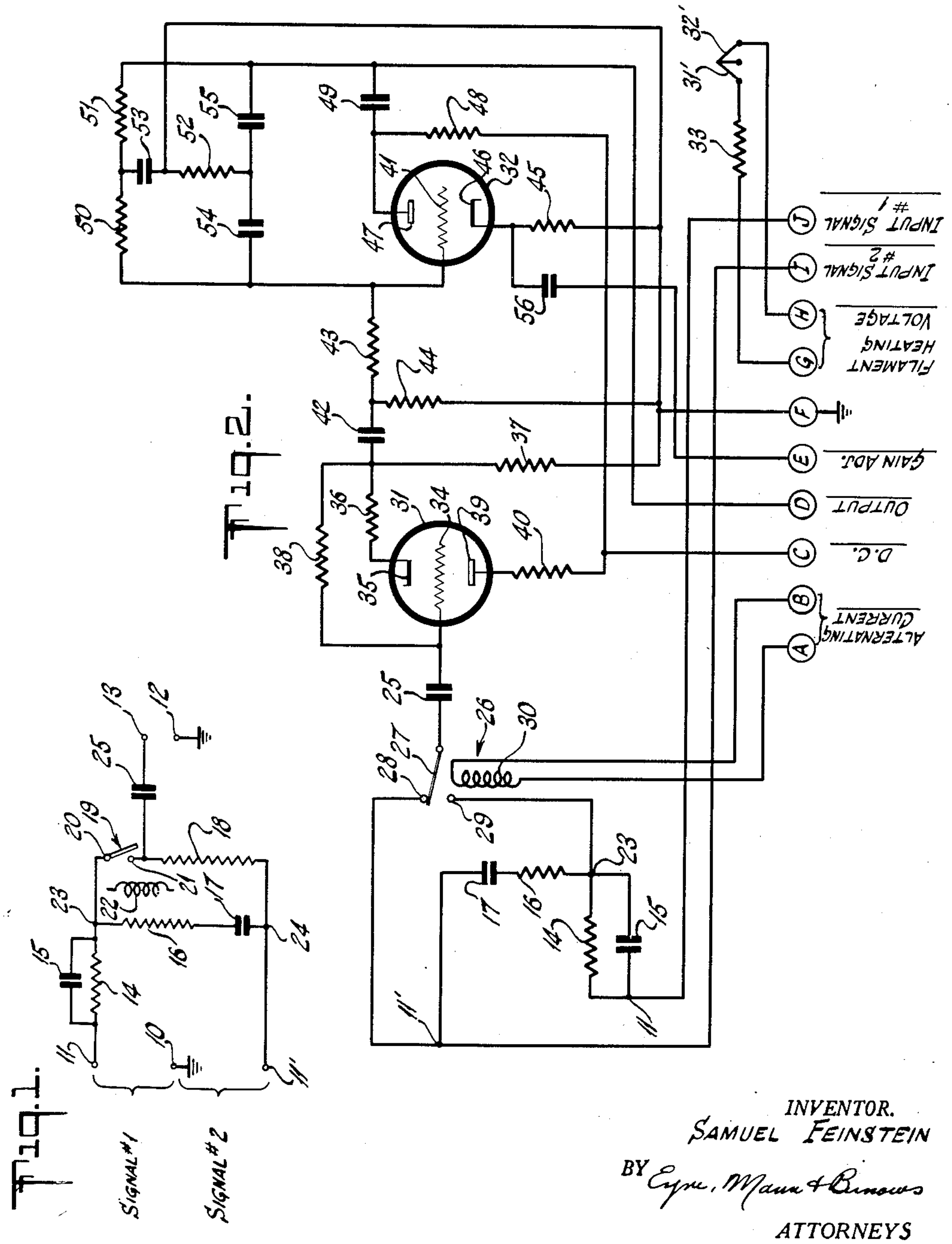
Fig. 1 is a circuit diagram of one embodiment of the invention.
Fig. 2 is a circuit diagram of another embodiment thereof.

The illustrated embodiments of the invention employ a single filter network such as a three-terminal network connected to treat simultaneously changes occurring in two different input signals. In effect the network sees only combined effects of the two signals and, as will be observed, the output signal to subsequent amplifiers comprises the signal at the output of the network raised to a level equal to the amplitude of one of the input signals. This is attained by a sampling procedure where one of the signals is sampled directly to produce a reference level above ground and then sampling the output of the network bridging the two signals. With the use of direct current signals at the input of the filter network it is possible to insert a capacitor in series with the output circuit of the sampling means to eliminate the direct current component of the signal and leave only the alternating current component produced by the sampling means and the combined variations in the two signals.

Fig. 1 illustrates a circuit that will perform the operation of treating the combined changes in two direct current signals with but a single network that eliminates any necessity for matching components in the manner required by prior systems of which I have knowledge, wherein two individual networks are used to treat the changes in each signal separately and before they are combined. In this figure the two signals have been designated as No. 1 and No. 2. Signal No. 1 is connected between the ground terminal 10 and the terminal 11, while signal No. 2 is connected between the ground terminal 10 and the terminal 11'. For present purposes it can be assumed that terminals 11 and 11' are maintained at a positive potential with respect to the ground 10. The treating network consisting of resistors 14 and 16 and condensers 15 and 17 is commonly termed in the art as a lead-lag network for both differentiating and integrating changes in direct current signals. Differentiation is accomplished by the resistor 16 and the condenser 15. The integrating step is accomplished by the resistor 14 and condenser 17.

The output of the circuit of Fig. 1 is adapted to be fed to the grid of an alternating current amplifier stage, hence the presence of the condenser 25 in series with the output terminal 13 to eliminate the direct current component. The terminal 21, part of the vibrator 19, is connected to the condenser 25 and to the terminal 24 through a resistor 18. When the vibrating arm 20 of vibrator 19 is open as illustrated in the figure, the full magnitude of signal No. 2 appears at terminal 21. This neglects any drop of voltage in resistor 18 because the load resistance between terminals 12 and 13 is generally many times the magnitude of resistor 18. When the vibrator arm 20 closes to connect terminal 21 with terminal 23, the potential appearing at terminal 23 appears on terminal 21 and terminal 13. This potential will not be affected by resistor 18 because its resistance is many times the impedance of the network. Because the network is connected between the positive sides of signals No. 1 and No. 2, and is not connected to ground, it will see only a single signal, that is the difference between the magnitude of the two input signals. Moreover, any changes occurring in one or both signals will merely appear to the network as a change in the difference signal. Thus a single network will act to treat changes in both signals exactly alike and completely avoids the necessity of two separate networks to treat the changes in each signal as required by prior practices.

The vibrator 19 also includes a coil 22 adapted to be energized by a suitable alternating current—say 400 C. P. S. Thus there is a periodic sampling of signal No. 2 directly and a signal which is a function of the potentials of both signal Nos. 1 and 2 and their time rate of change. This produces an interrupted output signal having alternately the amplitude of signal No. 2 and the amplitude of the modified difference between signal Nos. 1 and 2. Since the input signals 1 and 2 are direct current signals, the interposition of condenser 25 in the output circuit blocks any D. C. component and produces at terminal 13 an interrupted A. C. signal having an amplitude equal to the difference signal produced by the network and appearing in treated form on terminal 23.

The particular network comprising resistors 14 and 16 and condensers 15 and 17 form a lead-lag network. The resistor 16 and condenser 15 increase the sensitivity of the system to a rate of change occurring in the signals while the resistor 14 and condenser 17 perform an integrating function that increases the sensitivity of the system to steady state errors. This treatment of the signal has been found to be important in servomechanism devices wherein a motor is rotated one way or another in accordance with changes in magnitude of an input signal. Differentiating a change in amplitude of the signal when it begins to take place produces added power to get the motor started turning. Integrating the error signal tends to overcome constant errors and thus brings the motor to rest at a more nearly correct position. The frequency of the changes in the input signals may be very rapid or very slow and therefore the frequency of the vibrator is chosen to interrupt the signal at a rate that would enable it to be easily amplified by a conventional alternating current amplifier and of course produce a signal whose frequency is coordinated with the requirements of the device to be actuated thereby.

Fig. 2 is a somewhat simplified form of the circuit and is shown connected with a two-tube alternating current amplifier. As the elements of the networks of the two figures are identical, similar numerals have been used in both figures.

In this embodiment the input signals No. 1 and No. 2 are connected to terminals J and I respectively. Terminal J is connected directly to the input terminal 11 of the lead-lag network and terminal I to the terminal 11'. The output terminal of the network is designated by the numeral 23. The circuit thus far is identical to that shown in Fig. 1.

The vibrator 26 in Fig. 2, however, is of the single pole double throw type having a vibrating contact arm 27 and two fixed contacts 28 and 29. Contact 28 is connected to the network terminal 11', contact 29 to the output terminal 23 of the network and the vibrating arm to a blocking condenser 25. The arm is vibrated by an electromagnetic coil 30 connected to terminals A and B and energized by a suitable alternating current. As the vibrator is operated, it alternately samples first the input signal No. 2 that appears on terminal 11' and then the signal appearing on the output terminal 23 of the network. Thus in this modification the resistor 18 of Fig. 1 has been eliminated.

The amplifier driven by the output of the vibrator is shown with two stages and employs tubes 31 and 32. Tube 31 is connected as a cathode follower in order to secure a high input impedance and reduce the load on the lead-lag network. The second stage (tube 32) is of more or less conventional design. For simplicity, the filaments and heating circuit for tubes 31 and 32 are shown in the lower righthand part of the figure. The filaments 31' and 32' are connected in series with each other and in series with a dropping resistor 33 across the terminals G and H.

The signal produced by the action of the lead-lag network and vibrator 26 is impressed on the grid 34 of tube 31 through the blocking condenser 25. The cathode 35 is connected to the ground terminal F through a cathode bias resistor 36 and cathode load resistor 37. The grid return circuit comprises the resistor 38 connected between the grid 34 and the juncture of resistors 36 and 37. The plate 39 is connected by means of resistor 40 to the terminal C to which a high D. C. voltage is applied. As the resistor 37 is common to both the plate and grid circuits, inverse feedback action results to increase the input impedance of the tube far in excess of the sum of the resistances 38 and 37 and thus place negligible load on the lead-lag network.

The output of this stage is taken from the juncture of resistors 36, 37 and 38 and connected to the grid 41 of tube 32 through the series connected condenser 42 and resistor 43. The grid return circuit for the tube comprises resistors 43 and 44 connected between the grid 41 and the ground terminal F. The cathode circuit consists of resistor 45 connected from the cathode 46 to the ground terminal F, while the plate 47 is connected to the high voltage source on terminal C through the plate load resistor 48. The plate 47 is also connected to the output terminal D of the amplifier through a blocking condenser 49. Under certain conditions it may be desirable to increase the gain or amplification of the circuit and for this purpose a condenser 56 is connected between the cathode 46 of tube 32 and the terminal E. To increase the gain of tube 32 for a particular application it is only necessary to connect terminal E to the ground terminal F.

In applications where the device thus far described is intended for use in driving an A. C. motor, it is important that the frequency of the signal be coordinated with the frequency of the motor. In the case where the motor to be driven by the signal developed by the circuit in Fig. 2 is designed to operate on 400 C. P. S. the vibrator 26 should of course oscillate at that frequency. However, the signal developed by the vibrator has essentially a square wave form and it is desirable to remove the harmonics and leave only the 400 cycle fundamental to actuate the motor. The removal of the harmonics is accomplished in this embodiment by a 400 cycle parallel T feedback filter having maximum attenuation at 400 cycles. This filter comprises resistors 50, 51 and 52 and condensers 53, 54 and 55. The center point of the filter, namely the junction of resistor 52 and condenser 53 is connected to ground terminal F. The input sides of resistor 51 and condenser 55 are connected together and to output side of the blocking condenser 49 leading from the plate 47 of tube 32. The output sides of resistor 50 and condenser 54 are also connected together and are in turn connected directly to the grid 41 of tube 32. Thus the output signal from tube 32 is fed back inversely to the grid of tube 32 to cancel the input signal to that grid and thus reduce the output of the tube 32. However, as the parallel T filter is tuned to block a 400 cycle frequency, any 400 cycle frequency appearing at the grid 41 will not be canceled and will therefore appear at the output terminal D in amplified and substantially pure form.

The output signal thus produced by the amplifier above described is directly proportional to the error or difference signal obtained by comparing the two input signals Nos. 1 and 2, and of course the D. C. component is entirely removed. However, it is clearly seen that the accuracy of the circuit depends upon the accuracy with which the difference or error signal is determined. Actual tests have indicated that the use of separate treating filters, essentially the equivalent of two filters like that formed by the components denoted by the numerals 14 to 17, do not produce entirely accurate results because corresponding components in the two filters must be accurately matched and that even with the greatest care and precision substantial errors result. However, with this invention the single filter will see only differences in the input signals and, as it can sense only changes in the resultant difference signal, whether brought about by a change in one input signal or both, the changes in each signal are treated exactly alike. This circuit obviously eliminates all error in the production of the difference or error signal and enables the attainment of greater accuracy with devices or circuits with which the invention may be used.

I claim:

1. Means for comparing two signals comprising an input circuit for each signal with one side of each circuit connected to a common potential level, a differentiating and integrating electrical network connected across the other sides of said input circuits, and having an output terminal within the differentiating and integrating sections of the network, an output circuit and means connected with the output circuit for alternately sampling one signal directly and then the signal appearing at the output terminal of the network.

2. Means for comparing two signals comprising an input circuit for each signal with one side of each circuit referenced to a common potential level, a three-terminal electrical network having its common terminal connected to the other side of one input circuit and the input terminal connected to the other side of the other input circuit, an output circuit and means for periodically sampling the signal appearing on the common terminal of the network and then the signal appearing on the output terminal thereof.

3. Means for comparing two signals according to claim 2 wherein said electrical network comprises a resistor and a condenser connected in parallel between the input and output terminals thereof, and a second resistor and second condenser connected in series between the output terminal and the common terminal whereby identical treatment is accorded the changes in each of said signals.

4. Means for treating and comparing two direct current input signals to produce a third output signal having an alternating characteristic, comprising an input circuit for each input signal with one side of each circuit referenced to a common potental level, a three-terminal electrical network having its common terminal connected to the other side of one input circuit and the input terminal connected to the other side of the other input circuit, an output circuit and means for periodically sampling the signal appearing on the common terminal of the network and then the signal appearing on the output terminal thereof, said electrical network comprising a resistor and a condenser connected in parallel between the input and output terminals thereof, and a second resistor and second condenser connected in series between the output terminal and the common terminal whereby identical treatment is accorded changes in each of said signals.

5. Means for treating two electric signals to produce a third signal representing the difference between said signals, comprising an output circuit, means for applying one of said signals directly to the output circuit, and means for periodically completing a circuit between said signals and the output circuit to apply a difference signal to the output circuit whereby said output circuit receives a series of electric pulses having an amplitude substantially equal to that of said one signal plus the difference between said signals.

6. An electric circuit for treating two signals comprising a circuit for each signal, a connection between one side of each signal circuit and a predetermined potential reference level, an electrical network including at least two impedances bridging the other side of said signal circuits and having an output terminal, an output circuit, means connecting the other side of one of said signal circuits to the output circuit, and means for periodically connecting the output terminal of the impedance bridge to the output circuit to produce a difference signal in the output circuit.

SAMUEL FEINSTEIN.

No references cited.